United States Patent
Moore et al.

(10) Patent No.: US 6,560,769 B1
(45) Date of Patent: May 6, 2003

(54) COMPUTER-IMPLEMENTED METHOD FOR GENERATING A UML REPRESENTATION FROM JAVA SOURCE CODE

(75) Inventors: Jeffrey Allen Moore, Mission Viejo, CA (US); Joseph Peter Stefaniak, San Clemente, CA (US); Lonnie Dale Sulgrove, Rancho Santa Margarita, CA (US)

(73) Assignee: Unisys Corporation, Blue Bell, PA (US)

( * ) Notice: Subject to any disclaimer, the term of this patent is extended or adjusted under 35 U.S.C. 154(b) by 439 days.

(21) Appl. No.: 09/676,286

(22) Filed: Sep. 28, 2000

(51) Int. Cl.$^7$ ................................. G06F 9/44
(52) U.S. Cl. .................... 717/100; 717/101; 717/106; 717/108; 717/118; 707/100
(58) Field of Search ................ 717/100, 101, 717/102, 106, 118, 108; 707/100

(56) References Cited

U.S. PATENT DOCUMENTS

| | | | | |
|---|---|---|---|---|
| 6,018,627 A | * | 1/2000 | Iyengar et al. | 717/103 |
| 6,199,195 B1 | * | 3/2001 | Goodwin et al. | 717/104 |
| 6,332,198 B1 | * | 12/2001 | Simons et al. | 714/6 |
| 6,405,364 B1 | * | 6/2002 | Bowman-Amuah | 717/101 |
| 6,502,102 B1 | * | 12/2002 | Haswell et al. | 707/102 |
| 6,505,342 B1 | * | 1/2003 | Hartmann et al. | 717/104 |

OTHER PUBLICATIONS

Title: Round trip engineering with design patterns, UML, Java and C++, Authurs : Schäfer et al, ACM, 1999.*
Title: Integrating UML diagrams for production control systems, Authors: Hans J. Köhler et al, ACM, Jun., 2000.*
Title: A tool for designing Java programs with UML, Author: Anna Armentrout, ACM, Jun. 1999.*
Title: Visualizing the synchronization of Java threads with UML, IEEE, Mehner et al, 2000.*
Title: Modeling and simulation with UML and Java, authur: Kortright, E.V.; IEEE, Apr. 1997.*
Title: UML –Based Integration Testing, Hartmann, ACM, 2000.*

* cited by examiner

*Primary Examiner*—Gregory Morse
*Assistant Examiner*—Chameli C. Das
(74) *Attorney, Agent, or Firm*—Phuong-Quan Hoang; Mark T. Starr; Alfred W. Kozak

(57) ABSTRACT

A computer-implemented method for representing JAVA in UML in a computer system executing a repository program. The method comprises the steps of determining if a file is a JAVA package or project. If it is, then determining if there is a JAVA subpackage not represented in UML, and if so; recursively creating UML subpackages representing each nested JAVA subpackage. If it is determined that the file is not a JAVA package or project, then the method creates UML files representing each JAVA source file.

26 Claims, 8 Drawing Sheets

*REPRESENTING JAVA IN UML*

REPRESENTING JAVA IN UML

REPRESENTING JAVA SOURCE FILE IN UML

REPRESENTING JAVA CLASS IN UML

REPRESENTING JAVA
CLASS IN UML

*REPRESENTING JAVA INTERFACE IN UML*

REPRESENTING JAVA
INTERFACE IN UML

COMPUTER-IMPLEMENTED METHOD FOR GENERATING A UML REPRESENTATION FROM JAVA SOURCE CODE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

CROSS REFERENCE TO RELATED PATENT APPLICATIONS

This application relates to the following co-pending application, assigned to the same assignee hereof, which is incorporated herein by reference.

U.S. Ser. No. 09/676,289, entitled A METHOD FOR SYNCHRONIZING JAVA WITH UML IN A VERSION CONFIGURATION MANAGEMENT SYSTEM;

U.S. Ser. No. 09/676,288, entitled A COMPUTER-IMPLEMENTED METHOD FOR GENERATING JAVA USING FROM A UML REPRESENTATION; and, U.S. Ser. No. 09/676,284 entitled A METHOD FOR SYNCHRONIZING UML WITH JAVA IN A VERSION CONFIGURATION MANAGEMENT SYSTEM.

FIELD OF THE INVENTION

The present invention generally relates to software programming and in particular to a method for representing JAVA with the use of UML compliant tools.

BACKGROUND OF THE INVENTION

UML is a diagrammatic language and by using any modeling tool that supports UML, UML models can be visually represented to a user. UML enables users to see what a particular program looks like in model form.

JAVA, on the other hand, is not diagrammatic. A JAVA programmer's view is limited to the JAVA code and program output. The user must create a separate UML model in order to obtain a visual representation of the JAVA code.

Accordingly, there is a need to translate and represent JAVA code in UML. This would allow JAVA programmers to diagram JAVA code without having to create a separate model. The translation and generation should be made possible at the class, package, and project levels.

There is also a need to generate JAVA code from UML. This would allow models existing within UML to be transformed into a JAVA implementation that is ready for compiling.

SUMMARY OF THE INVENTION

A parser and generator sit on top of a server within an object-oriented repository, such as UREP, which is available from the assignee hereof. The program imports code within a JAVA project to the server.

The program parses the Java code for each JAVA source file within a JAVA project. This is done by parsing class names, class attributes, field names, and other information from JAVA source files.

The parsed information is then mapped to UML constructs and stored in an extensible Markup Language Metadata Interchange (XMI) file. An XMI file is a representation of the UML. Using the XMI file, Rational Rose can display the UML representation of the JAVA classes, allowing users to see a visual model of the JAVA code.

When translating from JAVA to UML, parsing can occur at the project, package, and class levels. A source file is the base JAVA file. Classes can be logically grouped to form packages, and packages can be grouped to form Java projects.

A feature of the present invention resides in the ability to parse JAVA and generate UML in a distributed environment without being limited by an IDE implementation.

Still another feature of the present invention is the ability to transform JAVA with finer granularity by parsing JAVA at the class, package, and project level and generating UML representation of class, package, and project.

Another feature of the present invention is the ability to support any IDE from JAVA that supports Source Code Control (SCC) API.

A still further feature of the present invention is the ability to support XMI.

These and other objects, which will become apparent as the invention is described in detail below, are provided by a computer-implemented method for representing JAVA in UML in a computer system executing a repository program. The method comprises the steps of determining if a file is a JAVA package or project. If it is, then determining if there is a JAVA subpackage not represented in UML, and if so; recursively creating UML subpackages representing each nested JAVA subpackage. If it is determined that the file is not a JAVA package or project, then the method creates UML files representing each JAVA source file.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
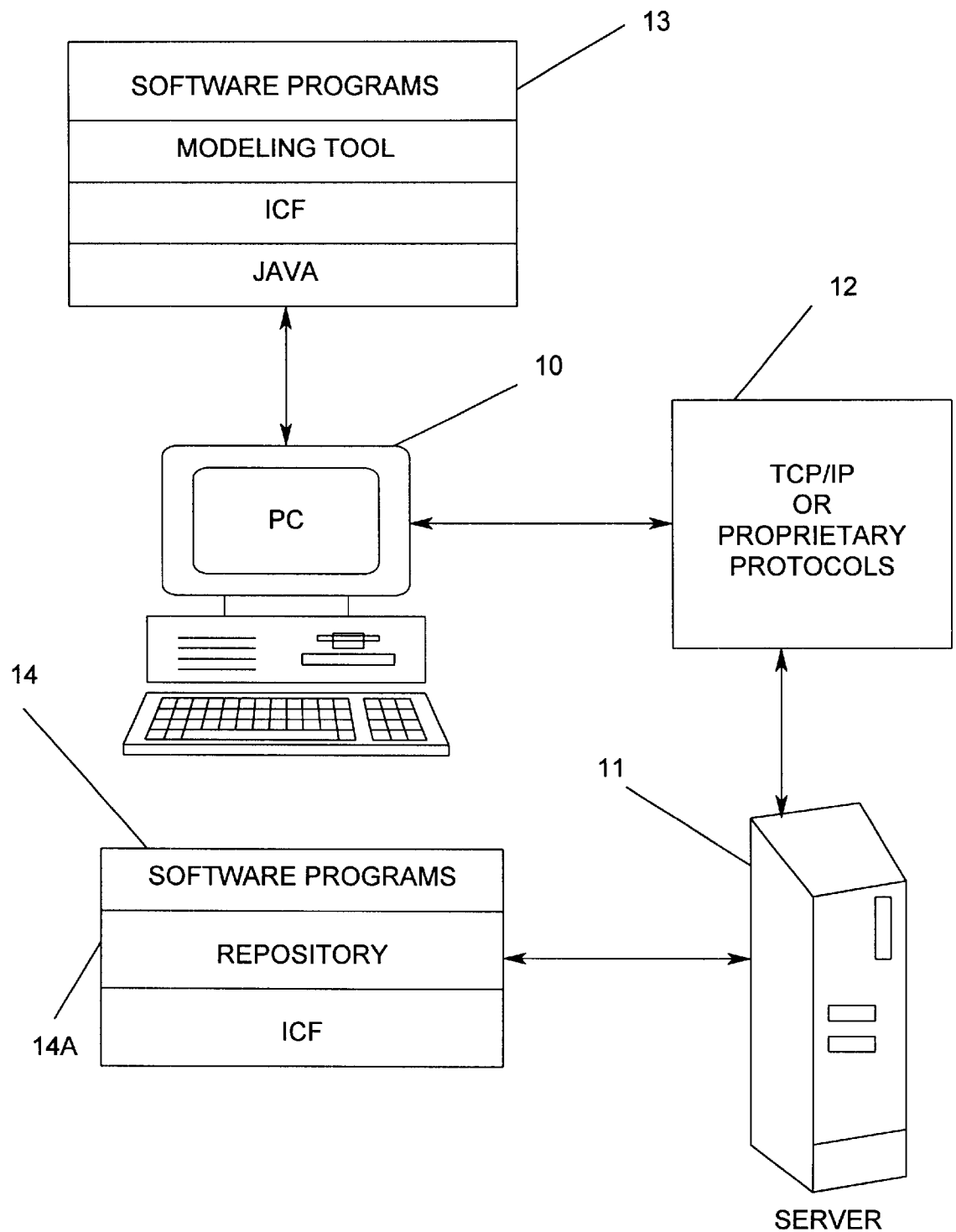
FIG. 1 is a block diagram of a system that may execute the method of the present invention.

Referring now to the drawings and FIG. 1 in particular, a block diagram of a system that may implement the process of the present invention is shown. Either a single computer 10 or a combination of the computer 10 and a server 11, which is shown coupled to the computer 10 by means of a TCP/IP or proprietary protocol 12, would be satisfactory for executing the process of the present invention. In the illustrated embodiment shown in FIG. 1, the computer 10 would typically be executing a variety of software 13, including a modeling tool, Unisys Integrated Component Framework (ICF) and JAVA development software. The server 11 in the illustrated embodiment is a server, which is capable of executing the NT operating system available from Microsoft Corporation of Redmond, Wash. The server 11 also executes a variety of software programs 14, including ICF, which is a framework that integrates third-party tools to provide full life-cycle model to deployment operation and management of components and a repository program 14A.

The repository 14A NOTE: WHERE IS 14A? further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN AN OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; and U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

The XMI protocol is further described in co-pending applications Ser. No. 09/282,345, filed Mar. 31, 1999, for A METHOD AND SYSTEM FOR GENERATING A SIMPLE DOCUMENT TYPE DEFINITION FOR DATA INTERCHANGE AMONG SOFTWARE TOOLS; Ser. No. 09/282,102, filed Mar. 31, 1999, for A METHOD AND SYSTEM FOR GENERATING A COMPACT DOCUMENT TYPE DEFINITION FOR DATA INTERCHANGE AMONG SOFTWARE TOOLS; Ser. No. 09/282,230, filed Mar. 31, 1999 for A METHOD AND SYSTEM FOR GENERATING A HIERARCHIAL DOCUMENT TYPE DEFINITION FOR DATA INTERCHANGE AMONG SOFTWARE TOOLS; Ser. No. 09/345,289, filed Jun. 30, 1999, for A METADATA DRIVEN SYSTEM AND METHOD FOR EFFECTING DATA INTERCHANGE AMONG SOFTWARE TOOLS IN A DISTRIBUTED ENVIRONMENT; Ser. No. 09/345,290, filed Jun. 30, 1999, for METHOD FOR IDENTIFYING UML OBJECTS IN A REPOSITORY WITH OBJECTS IN XML CONTENT; Ser. No. 09/322,137, filed May 28, 1999, for A SYSTEM AND METHOD FOR CONVERTING FROM ONE MODELING LANGUAGE TO ANOTHER; Ser. No. 09/345,291, filed Jun. 30, 1999, for A METHOD FOR VERSIONING A UML MODEL IN A REPOSITORY IN ACCORDANCE WITH AN UPDATED XML REPRESENTATION OF THE UML MODEL.

Figure 2:
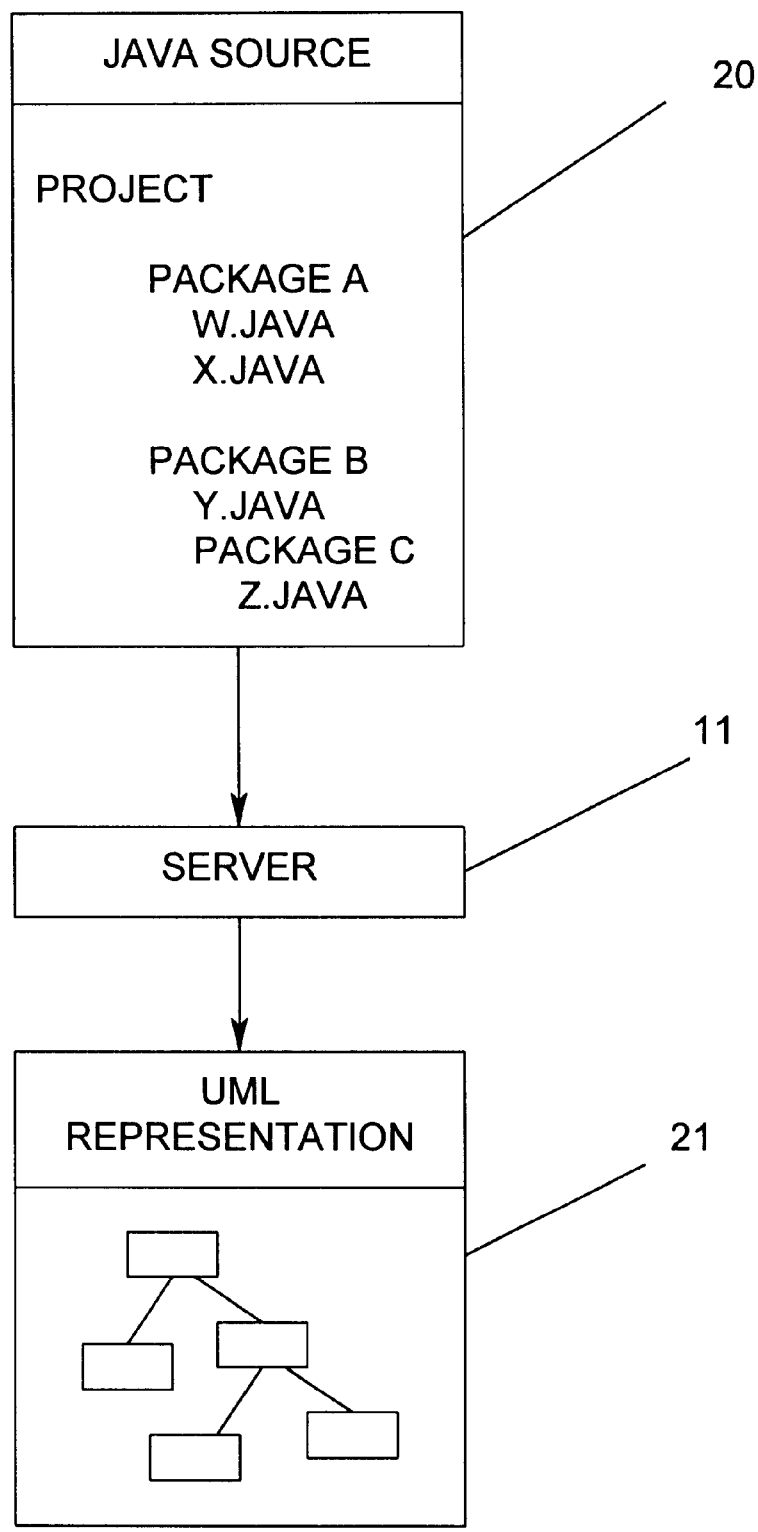
FIG. 2 is a diagram illustrating the path taken by the method of the present invention in representing JAVA in UML.

The function and operation of the present invention may be more fully appreciated with reference to FIG. 2, which is a diagram illustrating the path taken by the method of the present invention in representing JAVA in UML. A primary objective of this invention, as stated above, is to represent JAVA using UML, since JAVA is not a diagrammatic language like UML. In the diagram of FIG. 2, a JAVA source code 20 is translated into a UML representation 21 by use of the method of the present invention being executed by the server 11. The transformation from JAVA 20 to a UML representation 21 is shown in FIG. 3.

Figure 3:
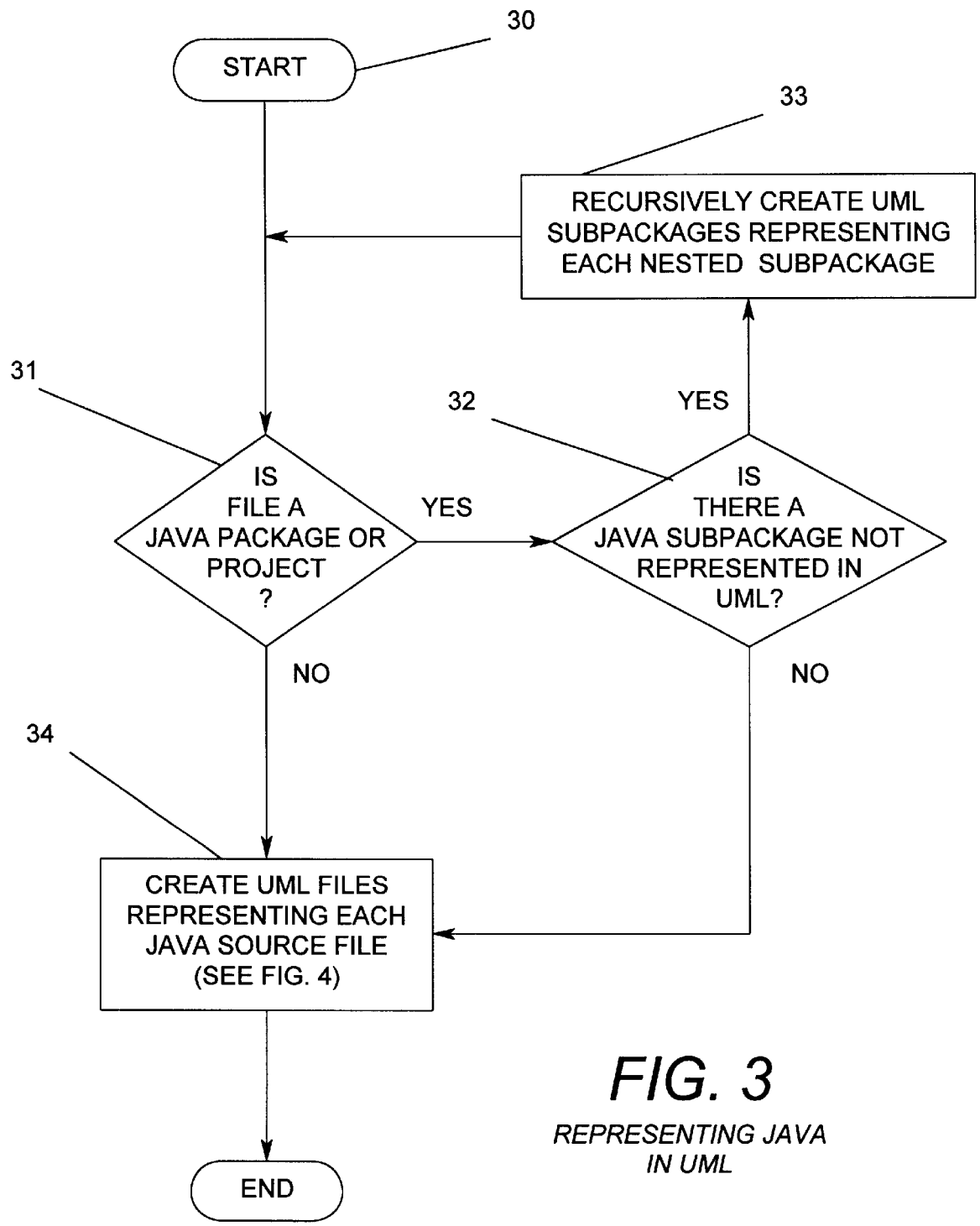
FIG. 3 is a flow chart of the process for representing JAVA in UML.

Referring now to FIG. 3, a flow chart illustrates the process for representing a JAVA source code in UML. The process begins with a start bubble 30, followed by an inquiry as to whether or not the file under examination is a package or a project (diamond 31). If the answer to this inquiry is yes, then another inquiry is made as to whether or not there is a JAVA sub-package not represented in UML (diamond 32). If the answer to this inquiry is yes, then UML sub-packages representing each nested sub-package are created recursively (block 33). If the answer to the inquiry depicted by either the diamond 31 or 32 is no, then UML files representing each JAVA source file are created (block 34). This part of the process is illustrated in greater detail in FIG. 4.

Figure 4:
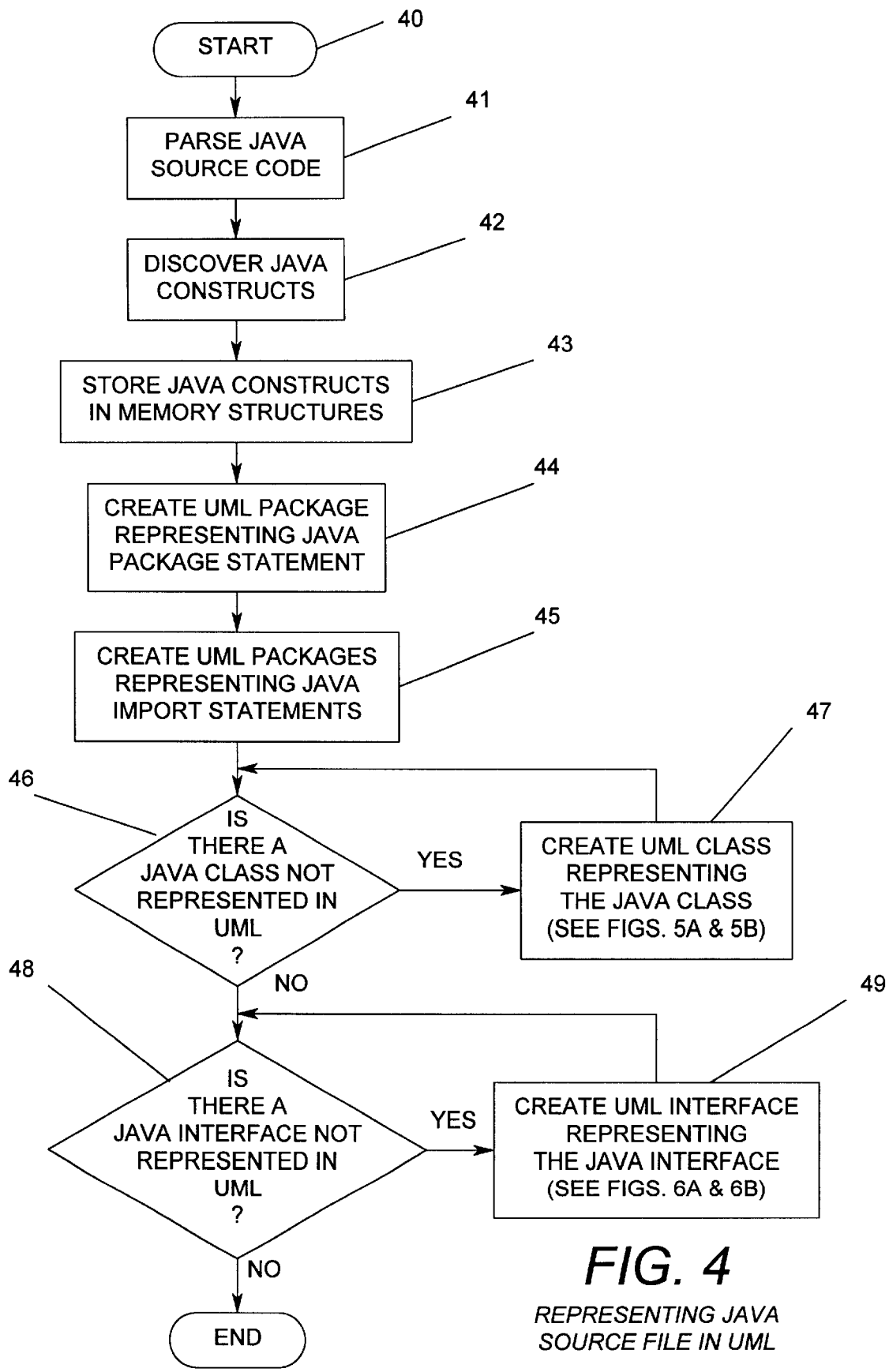
FIG. 4 is a flow chart of the process for representing a JAVA source in UML.

Referring now to FIG. 4 a flow chart illustrates the process for representing a JAVA file in UML. The process begins with a start bubble 40 followed by a step of parsing the JAVA source code to be represented in UML (block 41). Next, the JAVA constructs are discovered (block 42) followed by a step of storing the JAVA constructs discovered in memory structures (block 43). After this, a UML package representing the JAVA package statement is created (block 44), and UML packages representing the JAVA import statements are created (block 45).

Following the above, an inquiry is made as to whether or not there is a JAVA class not represented in UML (diamond 46). If the answer to this inquiry is yes, then a UML class representing the JAVA class is created (block 47) followed by a return back to the diamond 46 for the next class, if any. The step depicted by the block 47 is amplified in greater detail in FIGS. 5A and 5B, and described further hereinbelow. If the answer to this inquiry is no, then another inquiry is made as to whether or not there are is a JAVA interface not represented in UML (diamond 48). If the answer to this inquiry is yes, then a UML interface representing the JAVA interface is created (block 49 followed by a return back to the diamond 48 for the next interface, if any. The step depicted by the block 49 is amplified in greater detail in FIGS. 6A and 6B, and described further hereinbelow.

Figure 5A:
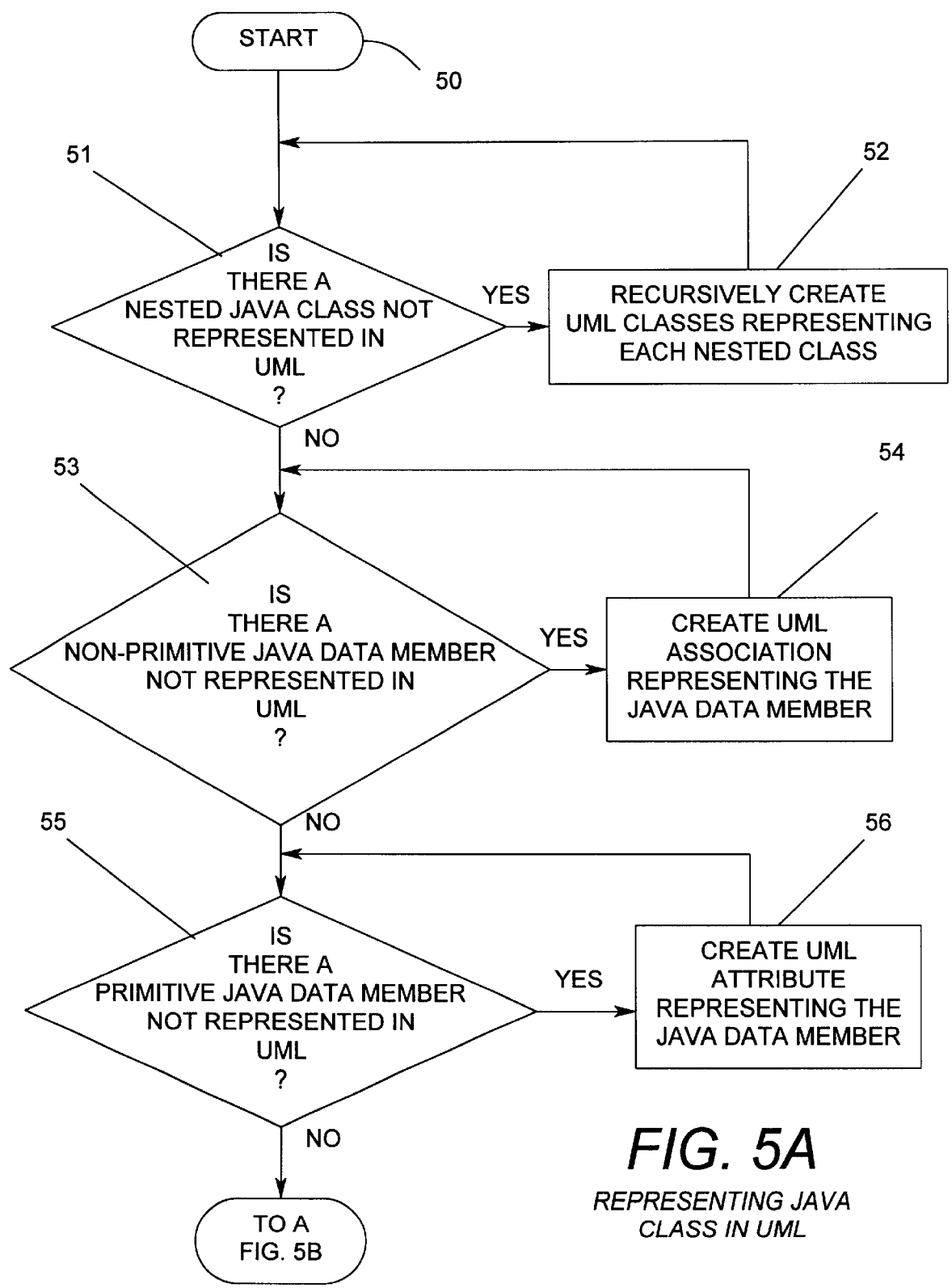
FIGS. 5A and 5B combined form a flow chart of the process for representing a JAVA class in UML.

Referring now to FIG. 5A, the first of a two-sheet drawing illustrates the process for representing a JAVA class in UML.

The process begins with a start bubble 50, followed by an inquiry as to whether or not there is a nested JAVA class not represented in UML (diamond 51). If the answer to this inquiry is yes, then UML classes representing each nested class are recursively created (block 52). On the other hand, if the answer to this inquiry is no, then another inquiry is made as to whether or not there is a non-primitive JAVA data member not represented in UML (diamond 53). If the answer to this inquiry is yes, then a UML association representing the JAVA data member is created (block 54). A return is then made back to the diamond 53 for the next non-primitive JAVA data member, if any. If the answer to the inquiry in the diamond 53 is no, then yet another inquiry is made as to whether or not there is a primitive JAVA data member not represented in UML (diamond 55). If the answer to this inquiry is yes, then a UML attribute representing the JAVA data member is created (block 56) and a return is made back to the diamond 55 for the next primitive JAVA data member, if any. If the answer to this inquiry is no, then a branch is made to FIG. 5B, as denoted by a connector A, for a continuation of the flow chart illustration.

Figure 5B:
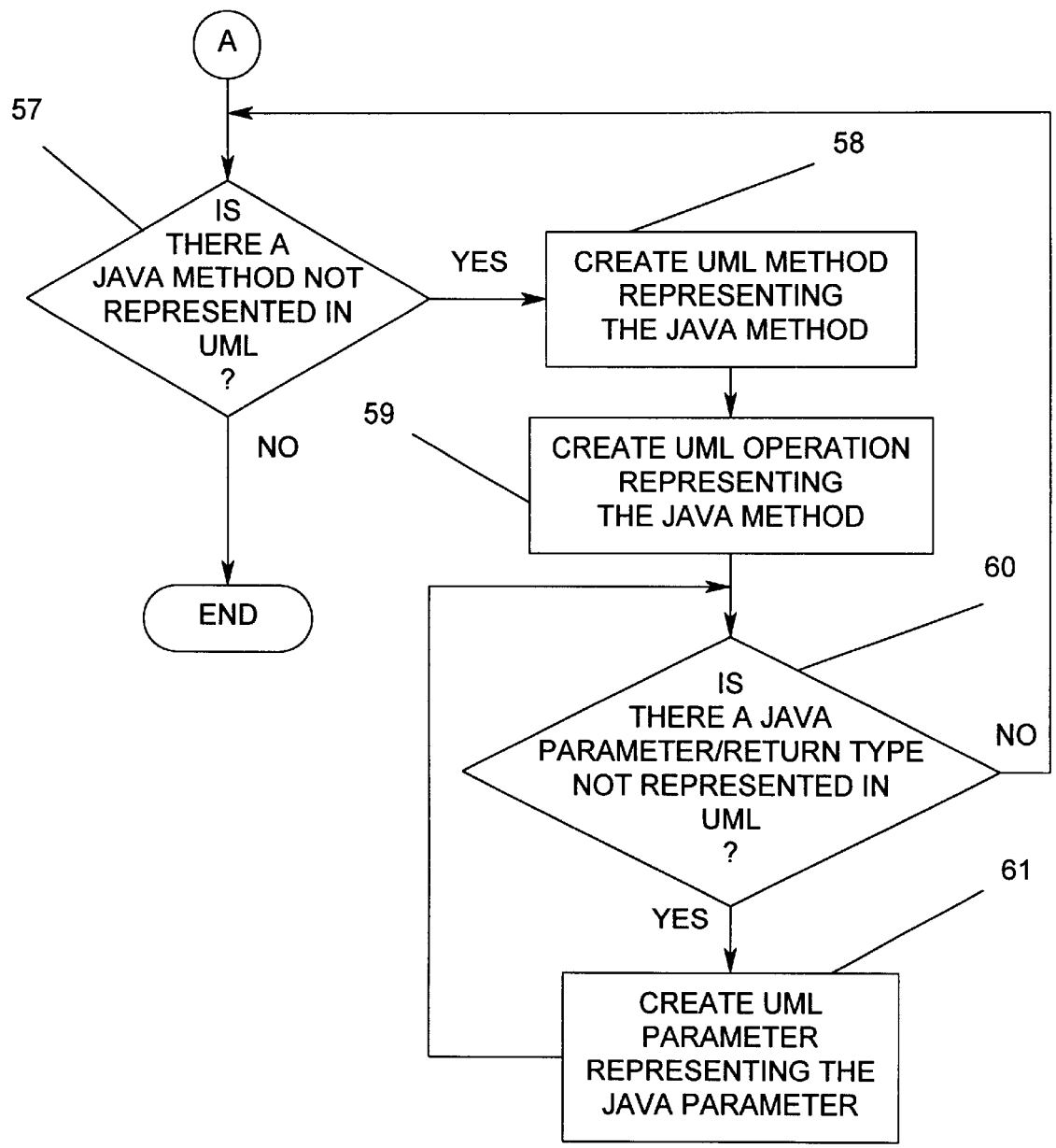

Referring now to FIG. 5B at the connector A, still another inquiry is made as to whether or not there is a JAVA method not represented in UML (diamond 57). If the answer to this inquiry is yes, then a UML method representing the JAVA method is created (block 58). Next, a UML operation representing the JAVA method is created (block 59). After this, an inquiry is made as to whether or not there is a JAVA parameter or return type for the JAVA method not represented in UML (diamond 60). If the answer to this inquiry is yes, then a UML parameter representing the JAVA parameter or return type is created (block 61) followed by a return back to the diamond 60 for the next JAVA parameter/return type, if any. On the other hand, if the answer to the inquiry depicted by the diamond 60 is no, then a return is made back to the diamond 57 for the next JAVA method, if any. If the answer to the inquiry depicted by the diamond 57 is no, then the process ends.

Figure 6A:
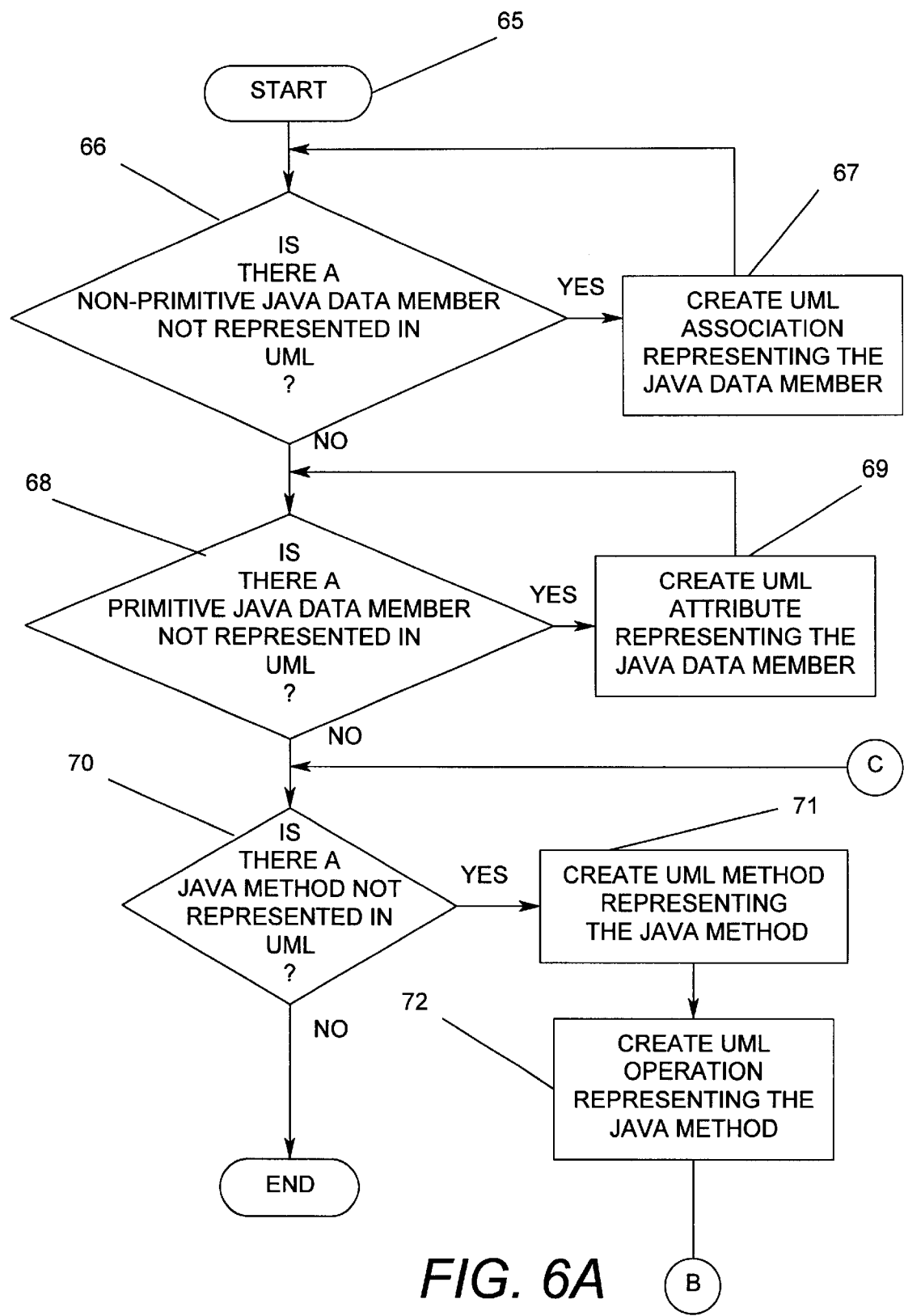
FIGS. 6A and 6B combined form a flow chart of the process for representing a JAVA interface in UML.

Referring now to FIG. 6A, the process for representing a JAVA interface in UML is shown. The process begins with a start bubble 65, followed by an inquiry as to whether or not there is a non-primitive JAVA data member not represented in UML (diamond 66). If the answer to this inquiry is yes, then a UML association representing the JAVA data member is created (block 67). A return is then made back to the diamond 66 for the next non-primitive JAVA data member, if any. If the answer to this inquiry is no, then another inquiry is made as to whether or not there is a primitive JAVA data member not represented in UML (diamond 68). If the answer to this inquiry is yes, then a UML attribute representing the JAVA data member is created (block 69). A return is then made back to the diamond 68 for the next primitive JAVA data member, if any.

If the answer to the inquiry depicted by the diamond 68 is no, then yet another inquiry is made as to whether or not there is a JAVA method not represented in UML (diamond 70). If the answer to this inquiry is yes, then a UML method representing the JAVA method is created (block 71) followed by a step of creating a UML operation representing the JAVA method (block 72). If the answer to the inquiry depicted by the diamond 70 is no, then the process ends. On the other hand, after completion of the step depicted by the block 72 the process illustration continues in FIG. 6B as denoted by a connector B.

Figure 6B:
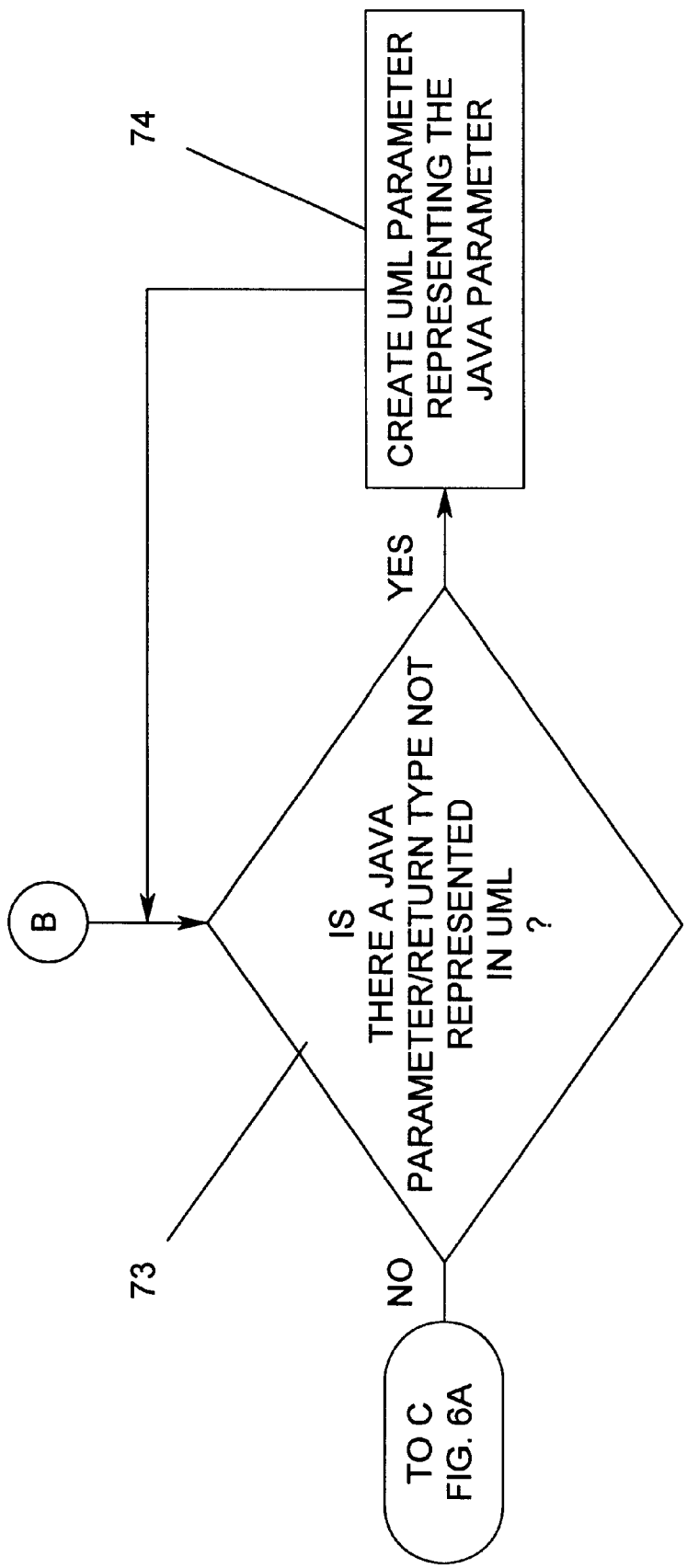

Referring now to FIG. 6B at the connector B, an inquiry is made as to whether or not there is a JAVA parameter or return type not represented in UML (diamond 73). If the answer to this inquiry is yes, then a UML parameter representing the JAVA parameter or return type is created (block 74). A return is then made back to the diamond 73 for the next JAVA parameter/return type, if any. On the other hand, if the answer to this inquiry is no, then a return is made back to connector C (FIG. 6A) for the next JAVA method not represented in UML.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system executing a repository program, a computer-implemented method for representing JAVA in UML, said method comprising the steps of:

a. determining if a file is a JAVA package or project, and if so;

b. determining if there is a JAVA subpackage not represented in UML, and if so;

c. recursively creating UML subpackages representing each nested JAVA subpackage; and, d. wherein it is determined in step a above that said file is not a JAVA package or project, creating UML files representing each JAVA source file.

2. The method as in claim 1 wherein it is determined that there is no JAVA subpackage not represented in UML, further comprising the step of creating UML files representing each JAVA source file.

3. The method as in claim 1 wherein said step of creating UML files representing each JAVA source file further comprises the steps of:

a. parsing said JAVA source file and discovering JAVA constructs;

b. storing said JAVA constructs;

c. creating a UML package representing JAVA package statement;

d. creating UML packages representing JAVA import statements;

e. determining if there is a JAVA class not represented in UML, and if so; and, f. creating a UML class representing said JAVA class.

4. The method as in claim 3 further comprising the steps of:
   a. determining if there is a JAVA interface not represented in UML, and if so;
   b. creating a UML interface representing said JAVA interface.

5. The method as in claim 4 wherein said step of creating a UML interface representing said JAVA interface further includes the steps of:
   a. determining if there is a non-primitive JAVA data member not represented in UML, and if so;
   b. creating UML association representing said JAVA data member.

6. The method as in claim 4 wherein said step of creating a UML interface representing said JAVA interface further includes the steps of:
   a. determining if there is a primitive JAVA data member not represented in UML, and if so;
   b. creating UML attribute representing said JAVA data member.

7. The method as in claim 4 wherein said step of creating a UML interface representing said JAVA interface further includes the steps of:
   a. determining if there is a JAVA method not represented in UML, and if so;
   b. creating a UML method representing said JAVA method; and,
   c. creating a UML operation representing said JAVA method.

8. The method as in claim 4 wherein said step of creating a UML interface representing said JAVA interface further includes the steps of:
   a. determining if there is a JAVA parameter/return type not represented in UML, and if so;
   b. creating a UML parameter representing said JAVA parameter.

9. The method as in claim 3 wherein said step of creating a UML class representing said JAVA class further includes the steps of:
   a. determining if there is a nested JAVA class not represented in UML, and if so;
   b. recursively creating UML classes representing each one of said nested classes.

10. The method as in claim 3 wherein said step of creating a UML class representing said JAVA class further includes the steps of:
    a. determining if there is a non-primitive JAVA data member not represented in UML, and if so;
    b. creating UML attribute representing said JAVA data member.

11. The method as in claim 3 wherein said step of creating a UML class representing said JAVA class further includes the steps of:
    a. determining if there is a primitive JAVA data member not represented in UML, and if so;
    b. creating a UML attribute representing said JAVA data member.

12. The method as in claim 3 wherein said step of creating a UML class representing said JAVA class further includes the steps of:
    a. determining if there is a JAVA method not represented in UML, and if so;
    b. creating a UML method representing said JAVA method;
    c. creating a UML operation representing said JAVA method;
    d. determining if there is a JAVA parameter/return type not represented in UML, and if so;
    e. creating a UML parameter representing said JAVA parameter.

13. The method as in claim 3 wherein said step of creating a UML class representing said JAVA class further includes the steps of:
    a. determining if there is a nested JAVA class not represented in UML, and if so;
    b. recursively creating UML classes representing each one of said nested classes.

14. A storage medium encoded with machine-readable computer program code for representing JAVA in UML, wherein, when the computer program code is executed by a computer, the computer performs the steps of:
    a. determining if a file is a JAVA package or project, and if so;
    b. determining if there is a JAVA subpackage not represented in UML, and if so;
    c. recursively creating UML subpackages representing each nested JAVA subpackage; and,
    d. wherein it is determined in step a above that said file is not a JAVA package or project, creating UML files representing each JAVA source file.

15. The storage medium as in claim 14 wherein it is determined that there is no JAVA subpackage not represented in UML, further comprising the step of creating UML files representing each JAVA source file.

16. The storage medium as in claim 14 wherein said step of creating UML files representing each JAVA source file further comprises the steps of:
    a. parsing said JAVA source file and discovering JAVA constructs;
    b. storing said JAVA constructs;
    c. creating a UML package representing JAVA package statement;
    d. creating UML packages representing JAVA import statements;
    e. determining if there is a JAVA class not represented in UML, and if so; and,
    f. creating a UML class representing said JAVA class.

17. The storage medium as in claim 16 further comprising the steps of:
    a. determining if there is a JAVA interface not represented in UML, and if so;
    b. creating a UML interface representing said JAVA interface.

18. The storage medium as in claim 17 wherein said step of creating a UML interface representing said JAVA interface further includes the steps of:
    a. determining if there is a non-primitive JAVA data member not represented in UML, and if so;
    b. creating UML association representing said JAVA data member.

19. The storage medium as in claim 17 wherein said step of creating a UML interface representing said JAVA interface further includes the steps of:
    a. determining if there is a primitive JAVA data member not represented in UML, and if so;
    b. creating UML attribute representing said JAVA data member.

20. The storage medium as in claim 17 wherein said step of creating a UML interface representing said JAVA interface further includes the steps of:
   a. determining if there is a JAVA method not represented in UML, and if so;
   b. creating a UML method representing said JAVA method; and,
   c. creating a UML operation representing said JAVA method.

21. The storage medium as in claim 17 wherein said step of creating a UML interface representing said JAVA interface further includes the steps of:
   a. determining if there is a JAVA parameter/return type not represented in UML, and if so;
   b. creating a UML parameter representing said JAVA parameter.

22. The storage medium as in claim 16 wherein said step of creating a UML class representing said JAVA class further includes the steps of:
   a. determining if there is a nested JAVA class not represented in UML, and if so;
   b. recursively creating UML classes representing each one of said nested classes.

23. The storage medium as in claim 16 wherein said step of creating a UML class representing said JAVA class further includes the steps of:
   a. determining if there is a non-primitive JAVA data member not represented in UML, and if so;
   b. creating UML attribute representing said JAVA data member.

24. The storage medium as in claim 16 wherein said step of creating a UML class representing said JAVA class further includes the steps of:
   a. determining if there is a primitive JAVA data member not represented in UML, and if so;
   b. creating a UML attribute representing said JAVA data member.

25. The storage medium as in claim 16 wherein said step of creating a UML class representing said JAVA class further includes the steps of:
   a. determining if there is a JAVA method not represented in UML, and if so;
   b. creating a UML method representing said JAVA method;
   c. creating a UML operation representing said JAVA method;
   d. determining if there is a JAVA parameter/return type not represented in UML, and if so;
   e. creating a UML parameter representing said JAVA parameter.

26. The storage medium as in claim 16 wherein said step of creating a UML class representing said JAVA class further includes the steps of:
   a. determining if there is a nested JAVA class not represented in UML, and if so;
   b. recursively creating UML classes representing each one of said nested classes.

* * * * *